United States Patent
Wu

(10) Patent No.: US 7,586,706 B1
(45) Date of Patent: *Sep. 8, 2009

(54) METHOD FOR CHECKING THE QUALITY OF SERVO GRAY CODES

(75) Inventor: Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/005,231

(22) Filed: Dec. 26, 2007

Related U.S. Application Data

(63) Continuation of application No. 11/492,428, filed on Jul. 25, 2006, now Pat. No. 7,315,427, which is a continuation of application No. 10/449,218, filed on May 30, 2003, now Pat. No. 7,113,356.

(60) Provisional application No. 60/410,016, filed on Sep. 10, 2002.

(51) Int. Cl.
*G11B 5/09* (2006.01)
(52) U.S. Cl. .................... 360/39; 360/46; 375/341; 714/769
(58) Field of Classification Search .............. None
See application file for complete search history.

(56) References Cited

U.S. PATENT DOCUMENTS

| | | | |
|---|---|---|---|
| 5,222,105 A | 6/1993 | Kinney et al. | |
| 5,334,978 A | 8/1994 | Halliday | |
| 5,341,387 A | 8/1994 | Nguyen | |
| 5,373,400 A | 12/1994 | Kovacs | |
| 5,465,182 A | 11/1995 | Ishikawa | |
| 5,600,941 A | 2/1997 | Strosser | 56/10.2 J |
| 5,706,222 A | 1/1998 | Bonaccio et al. | |
| 5,949,597 A | 9/1999 | Pahr | 306/46 |
| 6,008,746 A | 12/1999 | White | |
| 6,049,763 A | 4/2000 | Christiansen et al. | 702/133 |
| 6,055,121 A * | 4/2000 | Du et al. | 360/77.07 |
| 6,091,560 A | 7/2000 | Du | |
| 6,115,198 A | 9/2000 | Reed et al. | |
| 7,113,356 B1 * | 9/2006 | Wu | 360/39 |
| 2003/0151838 A1 | 8/2003 | Sawaguchi et al. | |

* cited by examiner

*Primary Examiner*—Andrew L Sniezek

(57) ABSTRACT

A dynamic threshold detector for a magnetic storage medium comprises a transition detector that receives data comprising pairs of values based on data received from the magnetic storage medium, each of the pairs of values including a first value and a second value, and that determines states of the first and second values in the pairs. A threshold selector varies a magnitude of a threshold based on the determined states.

23 Claims, 9 Drawing Sheets

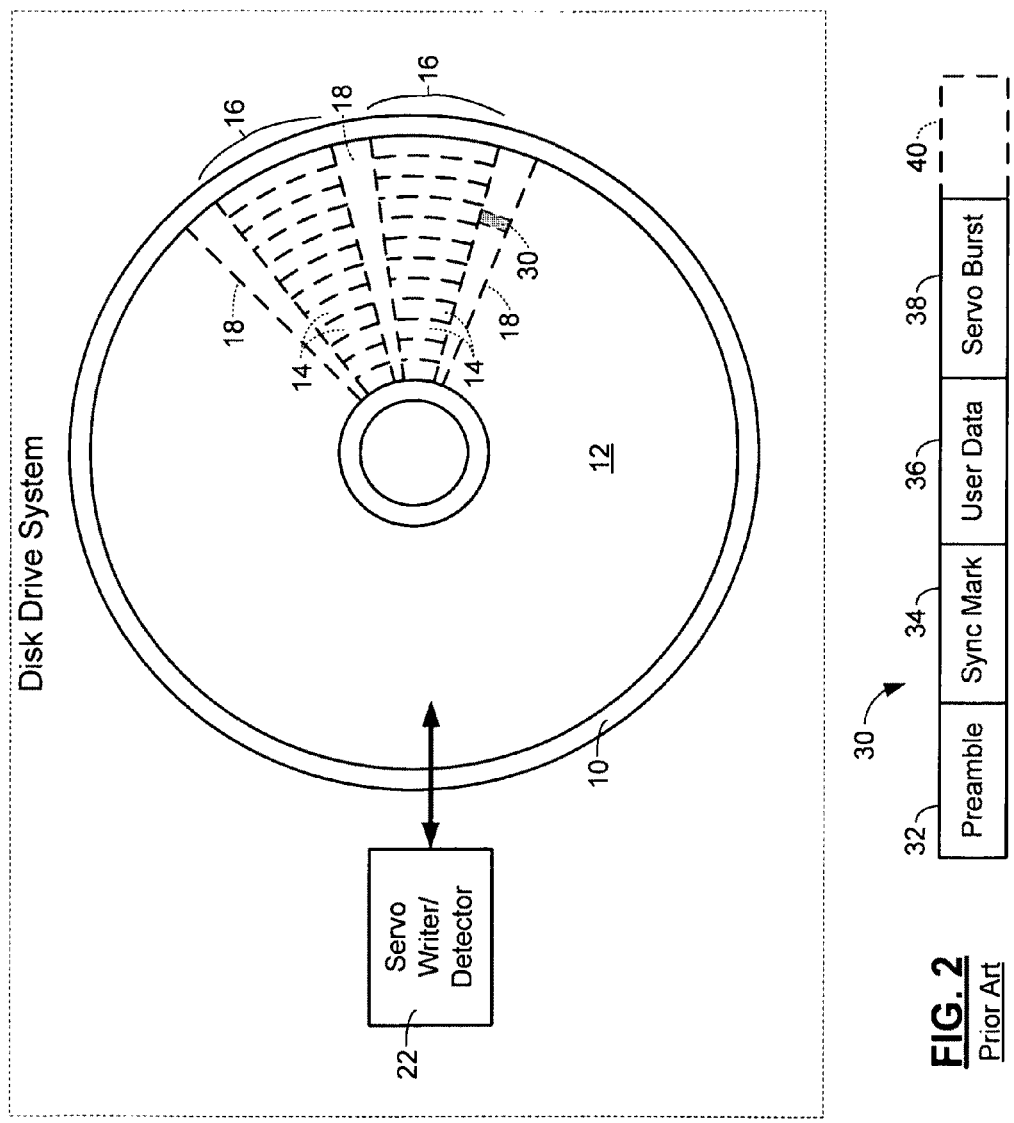

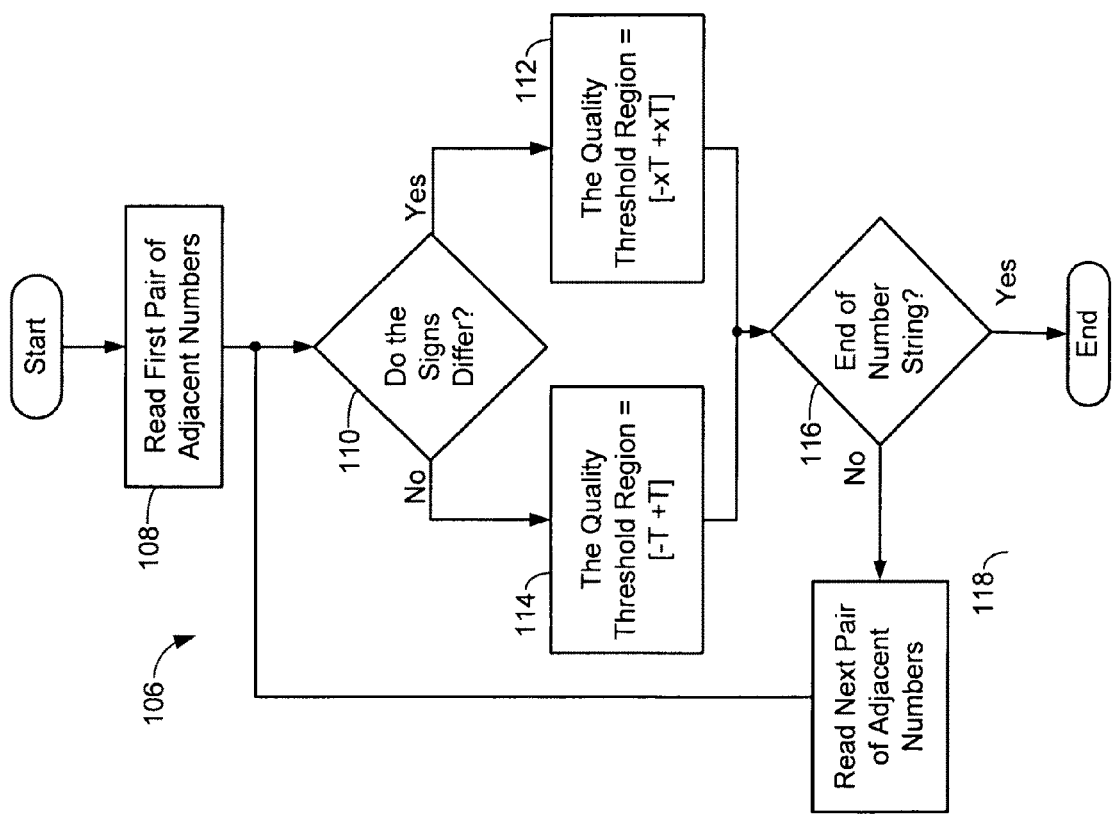

METHOD FOR CHECKING THE QUALITY OF SERVO GRAY CODES

CROSS-REFERENCE TO RELATED APPLICATIONS

This application is a continuation of U.S. patent application Ser. No. 11/492,428, filed Jul. 25, 2006, now U.S. Pat. No. 7,315,427, issued Jan. 1, 2008, which application is a continuation of U.S. patent application Ser. No. 10/449,218 filed on May 30, 2003, now U.S. Pat. No. 7,113,356, issued Sep. 26, 2006, which claims the benefit of U.S. Provisional Application No. 60/410,016, filed on Sep. 10, 2002. The disclosures of the above applications are incorporated herein by reference.

FIELD OF THE INVENTION

The present invention relates to magnetic storage systems, and more particularly to digital coding techniques used in magnetic storage systems.

BACKGROUND OF THE INVENTION

Magnetic storage systems such as hard disk drives are used to store data. The hard disk drives include one or more platters with an outer magnetic coating. The magnetic coating stores positive and negative magnetic fields that represent binary 1's and 0's. The platters are divided into concentric circles called tracks. The tracks are divided radially into sectors.

When the hard disk drives are manufactured, a servo writer/detector writes permanent servo wedges onto the platters between the sectors. The servo wedges contain data that is used by a read/write head to locate the tracks and sectors. The data includes track and sector numbers that are coded using Gray code.

Gray code represents consecutive decimal numbers using binary expressions that differ by only one bit. For example, the decimal numbers 0 and 1 can be represented by the binary Gray code numbers 00 and 01, respectively. The decimal number 2 can be represented by the binary Gray code number 11. The decimal number 3 can be represented by the binary Gray code number 10. Gray coded track/sector numbers are mapped using a second code and then written to a servo sector. The mapping codes provide additional protection against noise and increase reliability when the track/sector numbers are read back from the magnetic medium.

Dibit coding can be used to map the Gray coded track/sector numbers. Dibit code uses the bits 0000 to represent the Gray code bit 0 and the bits 1100 to represent the Gray code bit 1. During read back, the Gray coded track/sector numbers are represented by a number string. Adjacent samples in the number string are summed by a peak detector, which generates a second string of numbers. The peak detector uses a threshold to determine the Gray coded track/sector numbers based on the second string of numbers. A bad quality sample is declared when a sample in the second string of numbers is within a predetermined threshold. However, since Dibit code uses the bits 0000 to represent the Gray code bit 0, energy is only transmitted when the Gray code bit 1 is received. Therefore, there is no distinction between the transmission of the Gray code bit 0 and a condition when no signal being transmitted.

Manchester coding is also used to map the Gray coded track/sector numbers. Manchester code uses the bits 0011 to represent the Gray code bit 0 and the bits 1100 to represent the Gray code bit 1. During read back, the Gray coded track/sector numbers are represented by a number string.

Adjacent samples in the number string are summed to generate a new string of numbers. A Viterbi detector then determines the Gray coded track/sector numbers based on the new string of numbers. A bad quality sample is declared when a sample in the new string of numbers is within a predetermined threshold. When Manchester coding is used, energy is transmitted when both of the Gray code bits 0 and 1 are transmitted. However, the predetermined threshold does not adequately determine the readback quality of the detected Gray code.

SUMMARY OF THE INVENTION

A dynamic threshold detector for a servo writer/detector for a magnetic storage system with a magnetic medium includes a detector that receives data from the magnetic medium and that selects one of a first condition and a second condition based on at least one of an amplitude, a sign and bit transitions of said data. A threshold selector selects a first set of thresholds when the first condition is selected by the detector and a second set of thresholds when the second condition is selected by the detector.

In other features, a threshold comparator compares a selected one of the first and second sets of thresholds to the pairs of numbers to detect poor receiving quality. The first set of thresholds includes a first upper threshold and a first lower threshold. The second set of thresholds includes a second upper threshold and a second lower threshold.

In still other features, the pairs of numbers are generated by a Viterbi detector that sums adjacent numbers in a received string. The first upper threshold is less than the second upper threshold. An absolute value of the first lower threshold is less than an absolute value of the second lower threshold.

A servo writer/detector according to the present invention includes a Viterbi detector that receives a first number string from the magnetic medium and that sums adjacent numbers in the number string to generate a second number string. A quality monitor identifies poor receiving quality in the second number string using a dynamic threshold that is data dependent.

In still other features, a gray encoder generates Gray encoded data. A mapping module maps the Gray encoded data using a mapping code before the Gray encoded data is written to a magnetic medium. A detector receives the second number string that includes pairs of numbers each including a first number and a second number with one of a positive sign and a negative sign and selects one of a first condition when the signs of pairs are the same and a second condition when the signs of the pairs are different. A threshold selector selects a first set of thresholds when the first condition is detected by the detector and a second set of thresholds when the second condition is detected by the detector.

In other features, a threshold comparator compares a selected one of the first and second set of thresholds to the pairs of numbers to detect symbol errors. The first set of thresholds includes a first upper threshold and a first lower threshold. The second set of thresholds includes a second upper threshold and a second lower threshold. The first upper threshold is less than the second upper threshold. An absolute value of the first lower threshold is less than an absolute value of the second lower threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 illustrates servo wedges that are defined on a hard disk drive and that include track and sector data according to the prior art;

FIG. 2 illustrates an exemplary format of data stored in a typical servo sector on a hard disk drive platter according to the prior art;

FIG. 9 is a functional block diagram of an algorithm for a dynamic quality threshold according to the present invention.

DETAILED DESCRIPTION OF THE PREFERRED EMBODIMENTS

Figure 3:
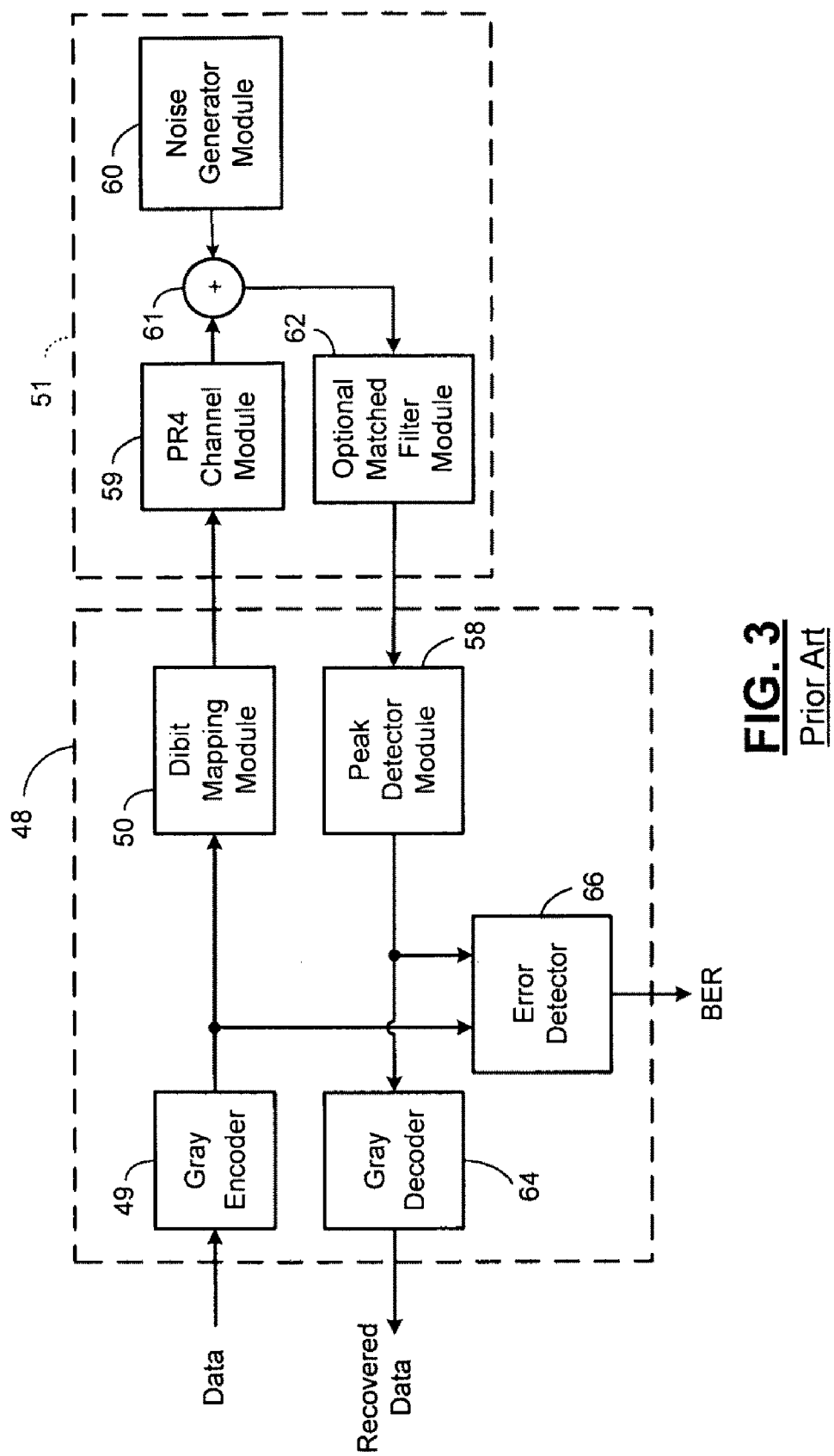
FIG. 3 is a functional block diagram of a servo writer and detector including Dibit mapping according to the prior art.

The following description of the preferred embodiment(s) is merely exemplary in nature and is in no way intended to limit the invention, its application, or uses. For purposes of clarity, the same reference numbers will be used in the drawings to identify similar elements.

Referring to FIG. 1, a magnetic medium 10 such as a hard disk drive platter is coated with a magnetic coating 12 that stores data in a nonvolatile manner. The magnetic coating 12 is divided into tracks 14, which include concentric circular sections. Sectors 16 are located between servo wedges 18. Servo wedges 18 contain data that helps a read/write head locate the tracks 14 and sectors 16 on the magnetic medium 12. A servo writer/detector 22 writes the servo wedges 18 onto the magnetic medium 12. The servo writer/detector 22 can be implemented in two or more separate hardware units or integrated as shown. The servo wedges 18 are further divided into servo sectors 30 that contain identification data for the adjacent tracks/sectors.

Referring now to FIG. 2, an exemplary servo sector 30 includes a preamble portion 32. The preamble portion 32 includes a fixed data pattern that is used to adjust a timing or gain loop. A sync mark portion 34 identifies the beginning of a user data portion 36. The sync mark portion 34 is also used to align the servo writer/detector 22 with the user data portion 36. The user data portion 36 includes digital Gray coded track and sector index information. A servo burst portion 38 includes analog data that identifies a position of a read/write head relative to a current track. While the data portions of the exemplary servo sector 30 are shown in FIG. 2, one or more additional data portions, identified at 40, may also be included. In addition, the relative order of the data portions may be varied.

Referring now to FIG. 3, a first servo writer and detector 48 implements Dibit mapping. Data including track/sector numbers is input to a Gray encoder 49. For example, the decimal number 3 may be represented by the Gray code number 010. The Gray coded bits are mapped by a Dibit mapping module 50. For example, the Gray code number 010 is converted to 000011000000 after Dibit encoding. At the output of the Dibit mapping module 50, the servo writer/detector 22 writes the numbers to a magnetic storage medium 51. During read back, a peak detector module 58, determines the Gray coded track/sector numbers based on the detected numbers.

Reference number 51 represents a model for the magnetic storage medium. The storage medium can be modeled by a partial response, class 4 (PR4) channel module 59 with a sampled channel response of [1, 0, −1]. The PR4 channel module 59 convolves the number from the Dibit mapping module 50 and the sampled channel response. For example, the bit string 000011000000 that is output by the Dibit mapping module 50 is convolved with [1, 0, −1] to produce a number string {1, 1, −1, −1}. A noise generator module 60 inputs a noise signal to a summer 61, which also receives an output of the PR4 channel module 59.

The received number string is input to a matched filter module 62, which convolves the received number string with [−1, 0, 1], which is the inverse of the sampled channel response of the PR4 channel module 59. For example, the number string {1, 1, −1, −1} that is output by the summer 61 is convolved with the matched filter response [−1, 0, 1] to produce the number string {−1, −1, 2, 2, −1, −1}. The peak detector module 58 sums the pairs of numbers to produce a number string {−2, 4, −2} and compares the number string to a static threshold, as will be described further below.

The recovered Gray code is decoded by the gray decoder 64 which outputs the recovered data. An error detector 66 compares a delayed output of the Gray encoder to the output of the peak detector module 58 to generate bit errors and/or a bit error rate (BER). The data and the recovered data can alternately be used to generate bit error and/or bit error rate data.

Figure 4:
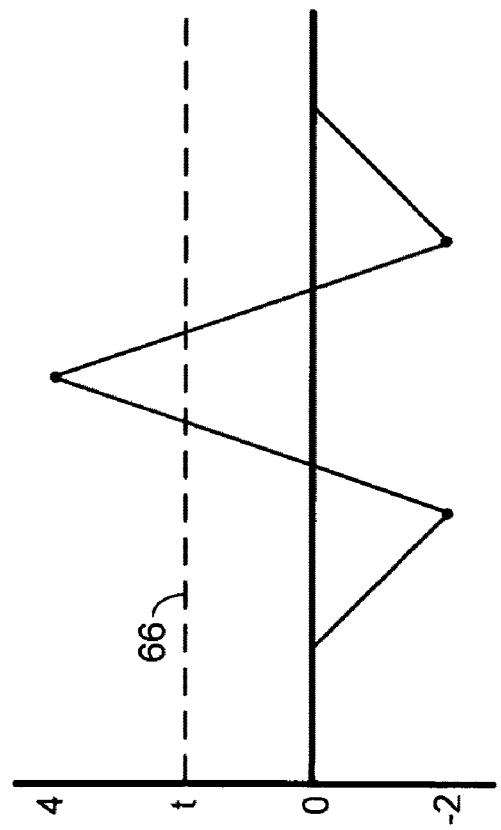
FIG. 4 is a plot of an exemplary number string from the servo writer and detector of FIG. 3 according to the prior art.

Referring now to FIG. 4, the peak detector module 58 compares the values of the number string to a static predetermined threshold 66. For example, the threshold may be set equal to 2. Values above the predetermined threshold 66 indicate the Gray code bit 1. Values below the predetermined threshold 66 indicate the Gray code bit 0. In FIG. 4, the number string {−2, 4, −2} is plotted. The first and third values are below the predetermined threshold 66 and the second value is above the predetermined threshold 66. This number string corresponds to the Gray coded number 010 and the decimal number 3.

Figure 5:
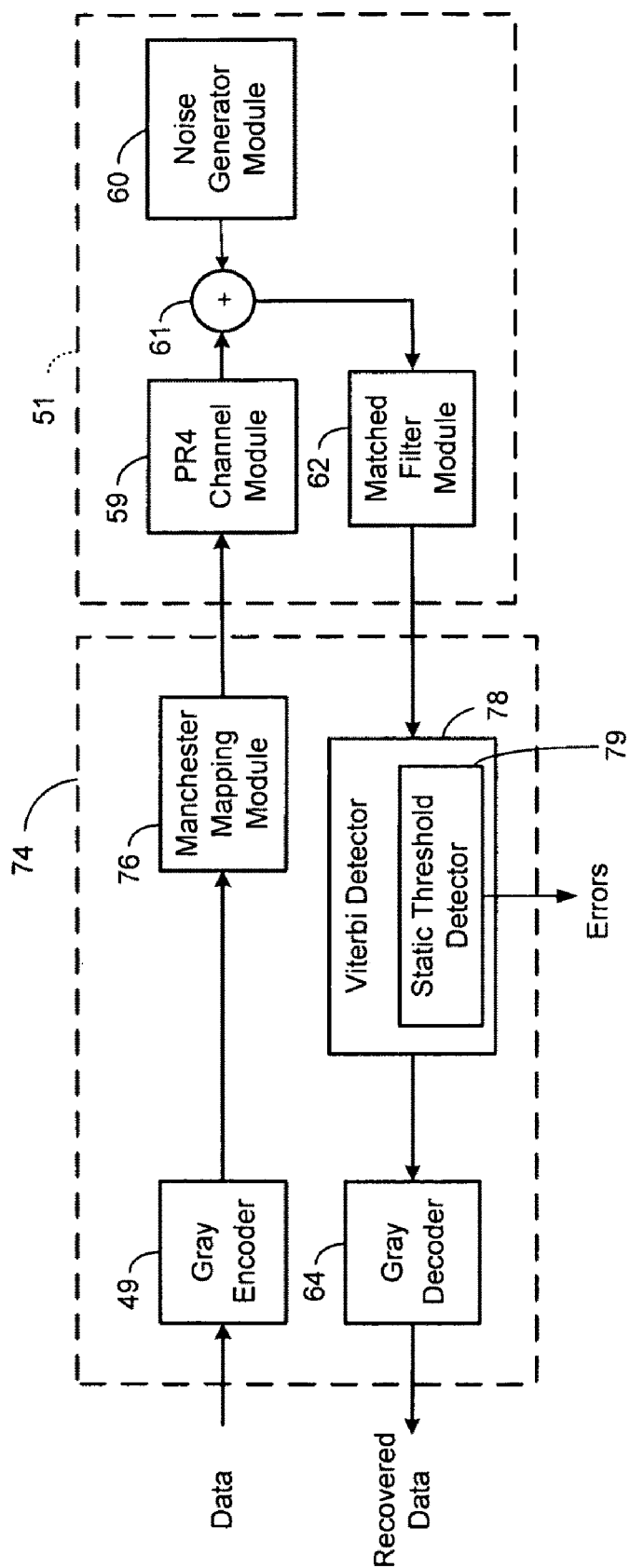
FIG. 5 is a functional block diagram of a servo writer and detector including Manchester mapping according to the prior art.

Referring now to FIG. 5, a second servo writer and detector 74 implements Manchester mapping. Track/sector numbers are initially Gray coded by the Gray encoder 49. The Gray coded bits are mapped by a Manchester mapping module 76. For example, the Gray code number 010 is converted to 001111000011 using Manchester mapping, which reduces error propagation due to catastrophic sequences (avoiding long strings of 0's and 1's). At the output of the Manchester mapping module 76, the servo writer/detector 22 writes the numbers to the magnetic storage medium 51. During read back, a Viterbi detector module 78 determines the Gray coded track/sector numbers based on the detected numbers.

The PR4 channel module 59 convolves the output of the Manchester mapping module 76 and the sampled channel response [1, 0, −1] to produce a number string. For example, the bit string 001111000011 that is output by the Manchester mapping module 76 is convolved with the sampled channel response [1, 0, −1] to produce the number string {1, 1, 0, 0, −1, −1, 0, 0, 1, 1, −1, −1}. Noise is added via a summer 61. The received number string is input to the matched filter module 62, which convolves the received number string with the response [−1, 0, 1] to produce a number string.

For example, the number string {1, 1, 0, 0, −1, −1, 0, 0, 1, 1, −1, −1} convolved with [−1, 0, 1] to produce the number string {−1, −1, 1, 1, 1, 1, −1, −1, −1, −1, 2, 2, −1, −1}. A Viterbi detector module 78 receives the number string and sums adjacent pairs of numbers. For example, the Viterbi detector module 78 converts the number string {−1, −1, 1, 1, 1, 1, −1, −1, −1, −1, 2, 2, −1, −1} into a paired number string {−2, 2, 2, −2, −2, 4, −2}. The Viterbi decoder 78 employs a static threshold detector 79 as will be described below to detect errors.

Figure 6:
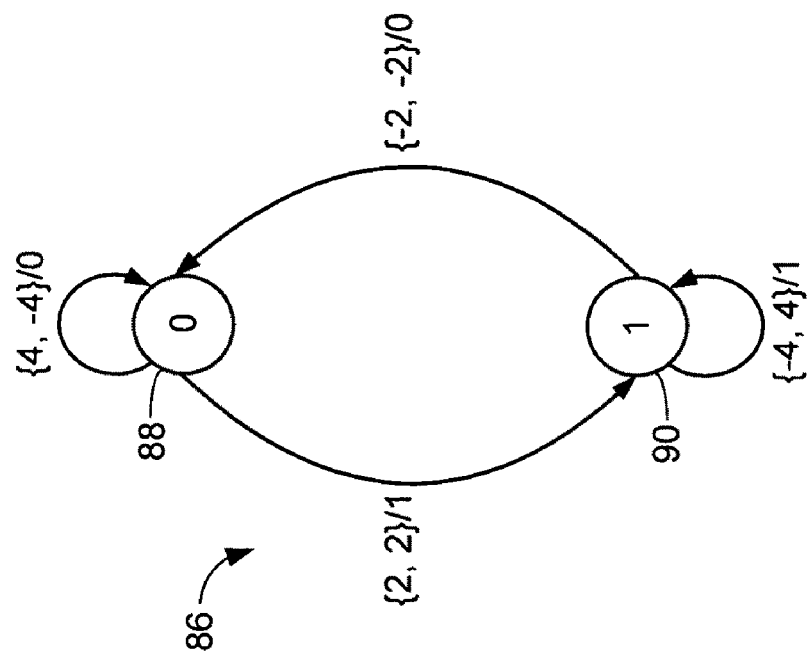
FIG. 6 is an exemplary state diagram that is used by the Viterbi detector module of FIG. 5 according to the prior art.

Referring now to FIG. 6, the Viterbi detector 78 determines the Gray coded track/sector numbers from a paired number string by using a state diagram 86. The initial value of −2 in the paired number string indicates an initial state of 0 and the final sequence of {4, −2} occurs when the final Gray code bit is 0. A first state 88 corresponds to the Gray coded bit 0. A second state 90 corresponds to the Gray coded bit 1. The Viterbi detector module 78 assumes an initial state of zero. A Gray coded number is determined by following the paths of the state diagram 86 based on the sequences in the received number string.

For example, the number string {−2, 2, 2, −2, −2, 4, −2} corresponds to the Gray code number 010. The initial value of −2 indicates an initial state of 0. The sequence {2, 2} corresponds to the Gray code bit 1. The Viterbi detector module 78 makes a transition from the first state 88 to the second state 90. The sequence {−2, −2} corresponds to the Gray code bit 0. The Viterbi detector module 78 makes a transition from the second state 90 to the first state 88. The final sequence {4, −2} occurs due to the fact that the final Gray code bit is 0.

Figure 7:
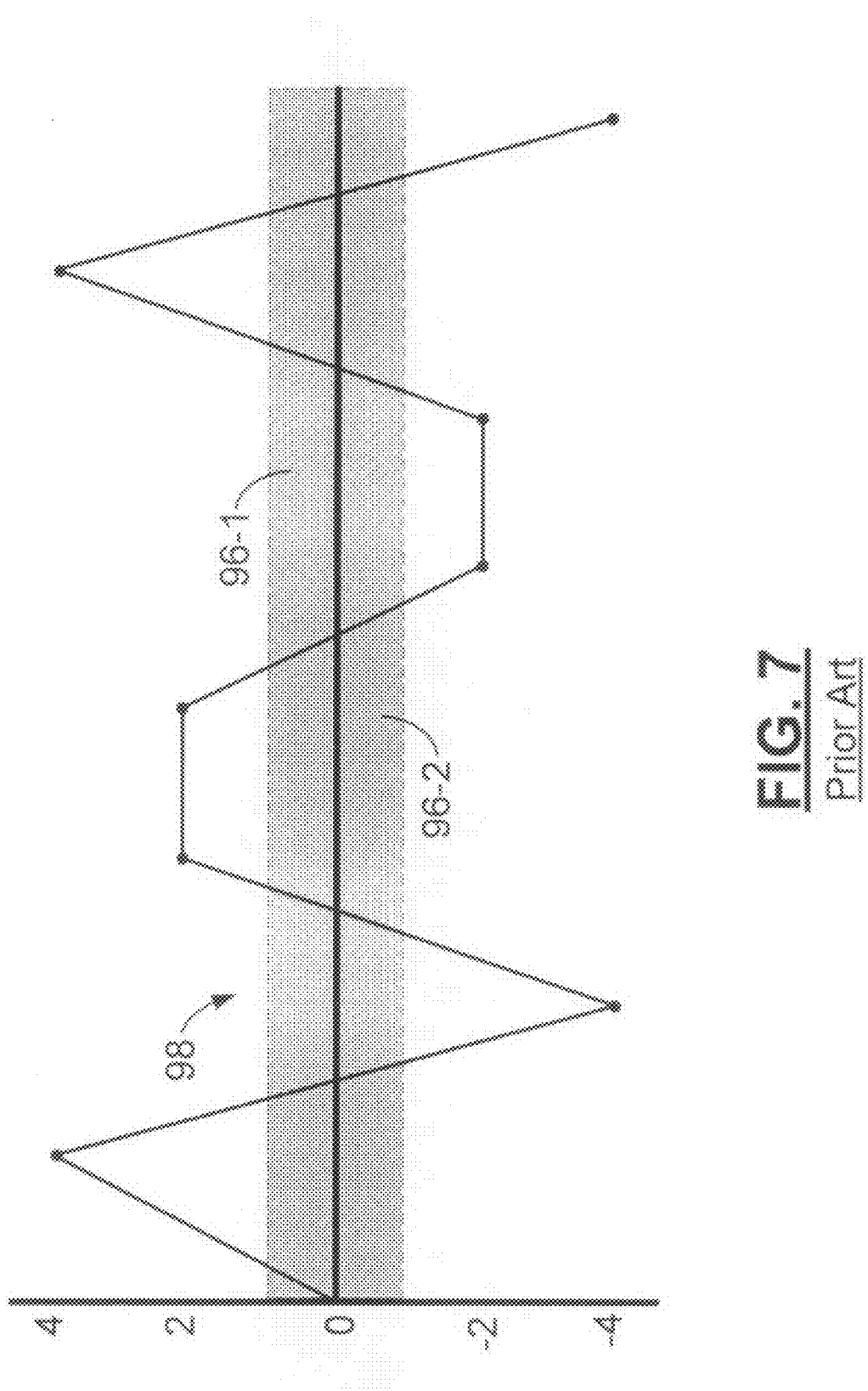
FIG. 7 is a plot of an exemplary number string from the servo writer and detector of FIG. 5 and includes a static quality threshold region according to the prior art.

The static threshold detector 79 is used to determine the reliability of the detected Gray code, which may be adversely impacted by channel noise. An exemplary detected sample from a servo writing process including Manchester mapping is shown in FIG. 7. The quality check fails a sample when the sample is within upper and lower limits 96-1 and 96-2, respectively, of a predetermined static threshold region 98. When the sample is within the predetermined static threshold region, there is a high probability that the sample contains bit errors. For example, the upper and lower limits 96-1 and 96-2, respectively, can be set to +T and −T, where 0<T<2.

Since samples from a servo writer/detector 74 that implements Manchester mapping have values at four different levels, including (−4, −2, 2, and 4), the predetermined static threshold region 98 is less able to identify bit errors that occur when the samples have higher amplitudes such as 4. In other words, it is possible for bad quality samples to be missed by the static quality check that is performed by the static threshold detector 79.

Figure 8A:
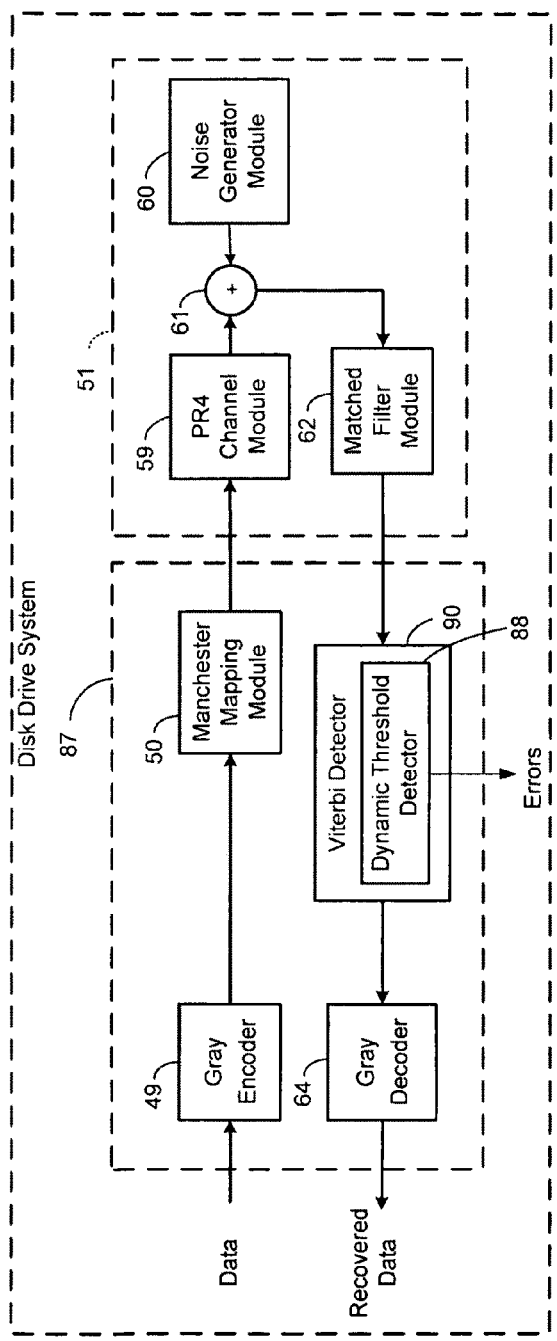
FIGS. 8A, 8B and 8C are functional block diagrams of servo writers/detectors according to the present invention.
Figure 8B:
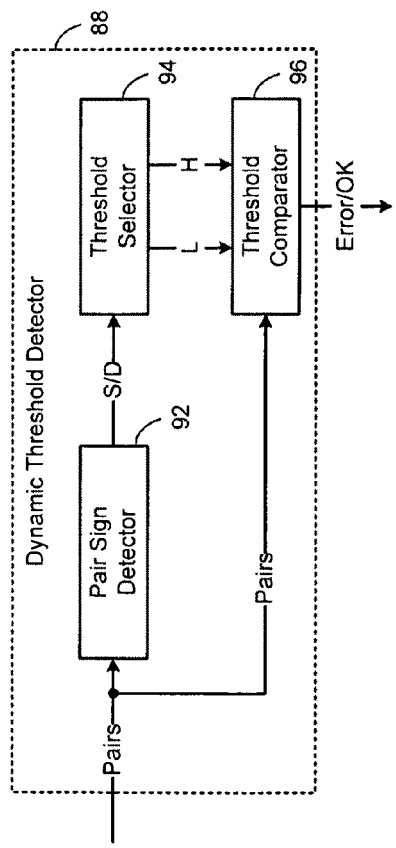

Referring now to FIGS. 8A and 8B, a servo writer/detector 87 includes a dynamic threshold detector 88 according to the present invention that has a data dependent threshold. While the servo writer/detector 87 is shown in a disk drive system, the servo/writer detector 87 can be implemented in any magnetic storage system. In a preferred embodiment, the data dependent threshold is set based on the sign of the samples. The dynamic threshold detector 88 can be integrated with Viterbi detector 90 as shown or implemented separately. Once adjacent samples are summed by the Viterbi detector module 90, four combinations of adjacent samples occur. The combinations are {4, −4}, {−4, 4}, {−2, −2}, and {2, 2}. When the adjacent samples have different signs, the amplitude of the samples is 4. When the adjacent samples have the same sign, the amplitude of the samples is 2. Therefore, the dynamic threshold detector 82 implements a first threshold having a larger amplitude when the signs of the adjacent samples are different. The detector implements a second threshold having a lower amplitude when the signs of the adjacent samples are the same.

Referring now to FIG. 8B, the dynamic threshold detector 88 is shown in further detail. A pair sign detector 92 receives pairs from the Viterbi detector 90 and detects whether the signs are the same (s) or different (d). A threshold selector 94 selects low and high thresholds based on the output of the pair sign detector 92. A threshold comparator 96 generates an error/ok signal depending on whether the pair values are within/outside of the low/high thresholds.

Referring now to FIG. 9, an algorithm 106 for a dynamic quality threshold detector according to the present invention is shown. After pairs of adjacent numbers from the servo writer/detector 80 are summed by the Viterbi detector module 84, the algorithm 106 adjusts the threshold region of the quality check depending on the signs of the adjacent samples. At step 108, the first pair of adjacent numbers are read.

In step 110, control determines whether the signs of the two samples in the first pair of adjacent numbers are different. If true, the threshold region is set to [−xT +xT] in step 112, where x is a scale factor of the value T. For example, with a scale factor of 2, a threshold at [−1.5 1.5] would increase to [−3 3]. Alternatively, positive and negative fixed values that are greater than +T and less that −T can be used instead of scaling +T and −T by a constant scale factor. When the signs of the two samples in the first pair of adjacent numbers are the same, the controller 20 sets the quality threshold region to [−T T] in step 114. The controller 20 proceeds from steps 112 and 114 to step 116. If the end of the number string is reached, control ends. Otherwise, the next pair of adjacent numbers is read in step 118 and control continues with step 110.

Figure 10:
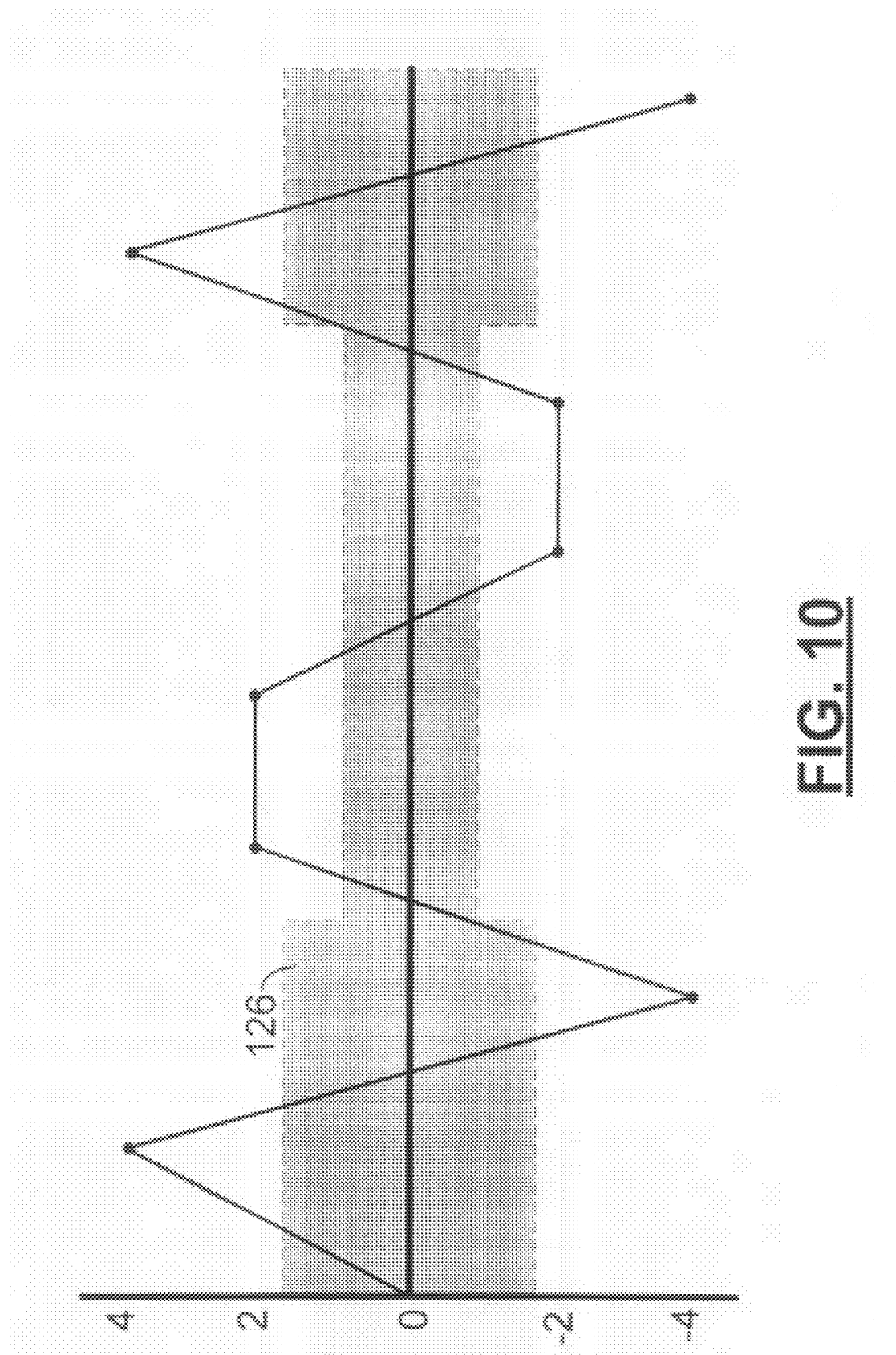
FIG. 10 is a plot of the number string of FIG. 7 relative to a dynamic quality threshold.

Referring now to FIG. 10, a dynamic quality threshold region 126 is illustrated with the detected sample of FIG. 7. The size of the dynamic quality threshold region 126 changes based on the signs of pairs of adjacent samples as shown in FIG. 8. When the signs of a pair of adjacent samples are the same, the dynamic quality threshold region 126 remains a predefined size. When the signs of a pair of adjacent samples are different, the size of the dynamic quality threshold region 126 is increased. The dynamic quality threshold region 126 has a larger area to detect poor quality samples when the amplitude of a pair of samples is 4. Samples within the dynamic quality threshold region 126 are declared poor quality samples.

Another method for adjusting the dynamic quality threshold detects bit transitions. Referring back to FIG. 6, when the Gray code bits following the state transitions from 0 to 0 or from 1 to 1, the threshold region is set to [−xT +xT] in step 112, where x is a scale factor of the value T. Otherwise, the threshold region is set to [−T, T]. The bit transitions can be determined within the Viterbi detector or from the output of the Viterbi detector.

Figure 8C:
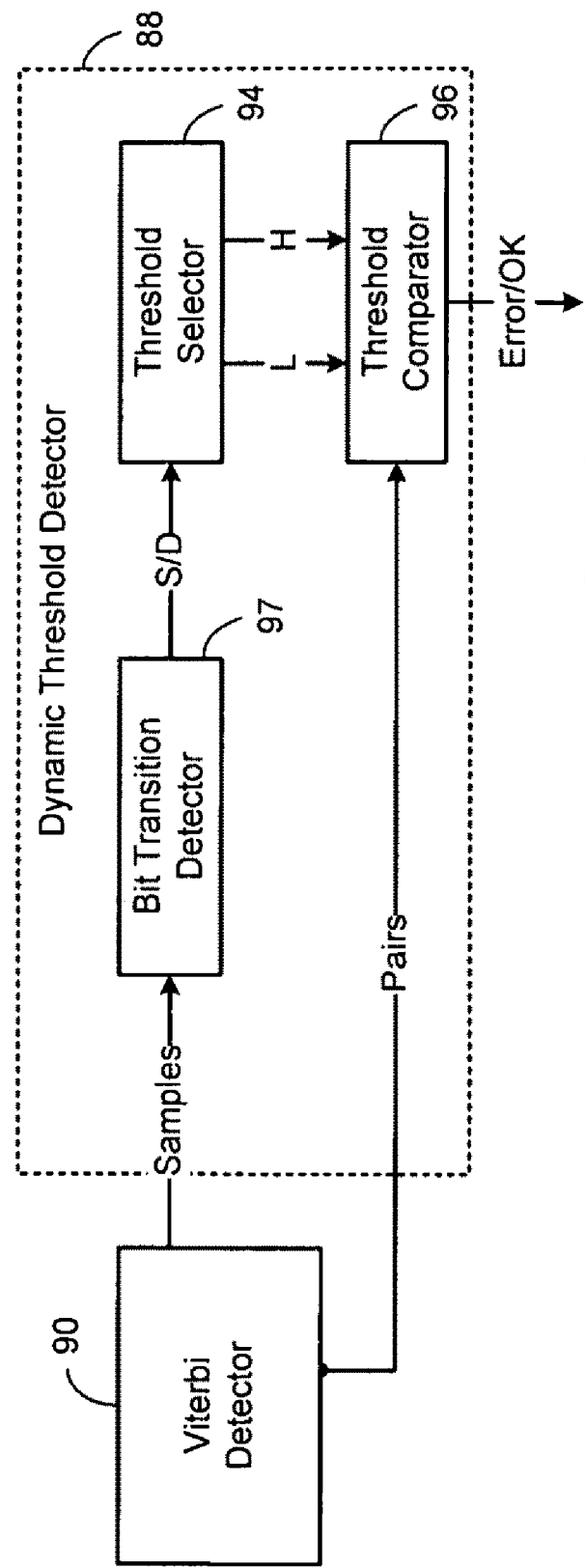

Referring now to FIG. 8C, a bit transition detector 97 receives samples or bits from the Viterbi detector 90 and detects whether bit transitions are between the same bits (0 to 0 or 1 to 1) or between different bits (0 to 1 or 1 to 0). A threshold selector 94 selects low or high thresholds based on the output of the bit transition detector 97. A threshold comparator 96 receives an output from the threshold selector 94 and pairs from the Viterbi detector 90. The threshold comparator 96 generates an error/ok signal depending on whether the pair values are within/outside of the low/high thresholds, as described above.

The present invention provides more reliable measure of the quality of servo Gray codes using the dynamic quality threshold region. As can be appreciated, the method of the present invention may also be used with other forms of coding.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following Claims.

What is claimed is:

1. A dynamic threshold detector for a magnetic storage medium, the dynamic threshold detector comprising:
    a transition detector that receives data comprising pairs of values based on data received from said magnetic storage medium, each of said pairs of values including a first value and a second value, and that determines signs of said first and second values in said pairs; and
    a threshold selector that varies a magnitude of a threshold based on said determined signs.

2. A dynamic threshold detector comprising:
    a transition detector that receives data comprising pairs of values, each of said pairs of values including a first value and a second value, and that determines signs of said first and second values in said pairs;
    a threshold selector that varies a magnitude of a threshold based on said determined signs; and
    a comparator that compares said first and second values in said pairs to said threshold.

3. A dynamic threshold detector comprising:
    a transition detector that receives data comprising pairs of values, each of said pairs of values including a first value and a second value, and that determines states of said first and second values in said pairs;
    a threshold selector that varies a magnitude of a threshold based on said determined states; and
    a comparator that compares said first and second values in said pairs to said threshold, wherein said comparator identifies an error when a magnitude of said first and second values in said pairs are less than said magnitude of said threshold.

4. A dynamic threshold detector comprising:
    a transition detector that receives data comprising pairs of values, each of said pairs of values including a first value and a second value, and that determines states of said first and second values in said pairs;
    a threshold selector that varies a magnitude of a threshold based on said determined states; and
    a Viterbi detector that generates said pairs of values.

5. The dynamic threshold detector of claim 4 wherein said pairs are encoded in Gray code.

6. A hard disk drive system comprising the dynamic threshold detector of claim 4.

7. The hard disk drive system of claim 6 further comprising:
    a gray encoder that generates Gray encoded data; and
    a mapping module that maps said Gray encoded data using a mapping code and that outputs said mapped Gray encoded data to a magnetic medium.

8. The hard disk drive system of claim 7 wherein said Viterbi detector generates said pairs based on data received from said magnetic medium.

9. A dynamic threshold detector for a magnetic storage medium, the dynamic threshold detector comprising:
    transition detecting means for receiving data comprising pairs of values based on data received from said magnetic storage medium, each of said pairs of values including a first value and a second value, and for determining of said first and second values in said pairs; and
    threshold selecting means for varying a magnitude of a threshold based on said determined signs.

10. A dynamic threshold detector, comprising:
    transition detecting means for receiving data comprising pairs of values, each of said pairs of values including a first value and a second value, and for determining signs of said first and second values in said pairs;
    threshold selecting means for varying a magnitude of a threshold based on said determined signs; and
    comparing means for comparing said first and second values in said pairs to said threshold.

11. A dynamic threshold detector, comprising:
    transition detecting means for receiving data comprising pairs of values, each of said pairs of values including a first value and a second value, and for determining states of said first and second values in said pairs;
    threshold selecting means for varying a magnitude of a threshold based on said determined states; and
    comparing means for comparing said first and second values in said pairs to said threshold, wherein said comparing means identifies an error when a magnitude of said first and second values in said pairs are less than said magnitude of said threshold.

12. A dynamic threshold detector, comprising:
    transition detecting means for receiving data comprising pairs of values, each of said pairs of values including a first value and a second value, and for determining states of said first and second values in said pairs;
    threshold selecting means for varying a magnitude of a threshold based on said determined states; and
    Viterbi detecting means for generating said pairs of values.

13. The dynamic threshold detector of claim 12 wherein said pairs are encoded in Gray code.

14. A hard disk drive system comprising the dynamic threshold detector of claim 12.

15. The hard disk drive system of claim 14 further comprising:
    Gray encoding means for generating Gray encoded data; and
    mapping means for mapping said Gray encoded data using a mapping code and for outputting said mapped Gray encoded data to a magnetic medium.

16. The hard disk drive system of claim 15 wherein said Viterbi detecting means generates said pairs of values from data stored on said magnetic medium.

17. A method of reading data from a magnetic storage medium, the method comprising:
    receiving data comprising pairs of values based on data received from said magnetic storage medium, each of said pairs of values including a first value and a second value;
    determining signs of said first and second values in said pairs; and
    varying a magnitude of a threshold based on said determined signs.

18. A method comprising:
receiving data comprising pairs of values, each of said pairs of values including a first value and a second value;
determining signs of said first and second values in said pairs;
varying a magnitude of a threshold based on said determined signs; and
comparing said first and second values in said pairs to said threshold.

19. A method comprising:
receiving data comprising pairs of values, each of said pairs of values including a first value and a second value;
determining states of said first and second values in said pairs;
varying a magnitude of a threshold based on said determined states;
comparing said first and second values in said pairs to said threshold; and
identifying an error when a magnitude of said first and second values in said pairs are less than a magnitude of said threshold.

20. A method comprising:
receiving data comprising pairs of values, each of said pairs of values including a first value and a second value;
determining states of said first and second values in said pairs;
varying a magnitude of a threshold based on said determined states; and
using a Viterbi detector to generate said pairs of values.

21. The method of claim 20 further comprising encoding said pairs using Gray code.

22. The method of claim 20 further comprising:
generating Gray encoded data; and
mapping said Gray encoded data using a mapping code; and
outputting said mapped Gray encoded data to a magnetic medium.

23. The method of claim 22 further comprising generating said pairs of values using said Viterbi detector based on data received from said magnetic medium.

* * * * *